US010509105B2

United States Patent
Yang et al.

(10) Patent No.: US 10,509,105 B2
(45) Date of Patent: Dec. 17, 2019

(54) RADAR DEVICE AND FREQUENCY INTERFERENCE CANCELLATION METHOD THEREOF

(71) Applicant: Digital Edge Inc., Anyang-si, Gyeonggi-do (KR)

(72) Inventors: Hee Jin Yang, Seoul (KR); Soo Ho Choi, Seongnam-si (KR)

(73) Assignee: Digital Edge Inc., Anyang-si, Gyeonggi-do (KR)

( * ) Notice: Subject to any disclaimer, the term of this patent is extended or adjusted under 35 U.S.C. 154(b) by 262 days.

(21) Appl. No.: 15/545,470

(22) PCT Filed: Sep. 25, 2015

(86) PCT No.: PCT/KR2015/010187
§ 371 (c)(1),
(2) Date: Jul. 21, 2017

(87) PCT Pub. No.: WO2016/137074
PCT Pub. Date: Sep. 1, 2016

(65) Prior Publication Data
US 2018/0003799 A1  Jan. 4, 2018

(30) Foreign Application Priority Data

Feb. 24, 2015  (KR) .................. 10-2015-0025933

(51) Int. Cl.
*G01S 7/35* (2006.01)
*G01S 7/02* (2006.01)
(Continued)

(52) U.S. Cl.
CPC .............. *G01S 7/354* (2013.01); *G01S 7/023* (2013.01); *G01S 13/345* (2013.01); *G01S 13/38* (2013.01);
(Continued)

(58) Field of Classification Search
CPC ........ G01S 7/023; G01S 13/931; G01S 7/292; G01S 7/354; G01S 7/4021; G01S 7/285;
(Continued)

(56) References Cited

U.S. PATENT DOCUMENTS 8,288,707 B2 * 10/2012 Hauske ..................... G01V 8/12
250/221
8,958,764 B1 * 2/2015 Xu .......................... H04L 27/22
455/196.1
(Continued)

FOREIGN PATENT DOCUMENTS

JP 09-274079 A 10/1997
JP 2002-156444 A 5/2002
(Continued)

*Primary Examiner* — Olumide Ajibade Akonai
(74) *Attorney, Agent, or Firm* — Novick, Kim & Lee, PLLC; Jae Youn Kim

(57) ABSTRACT

The present invention relates to a radar device and a frequency interference cancellation method thereof, and arranges a configuration comprising: an antenna unit for transmitting a radar transmission signal to a periphery and receiving a signal reflected from a target; an RF unit for generating the transmission signal, converting frequencies of a transmission signal and a reception signal, and amplifying a reception signal; a signal processing unit for generating a control signal to generate the transmission signal and cancelling frequency interference from a reception signal of the RF unit; and a control unit for generating radar detection information by using an output signal of the signal processing unit, and tracking information by accumulating the radar detection information. The present invention enables real time changing of a hopping pattern according to a radar frequency interference environment, thereby achieving operation of the hopping pattern adaptively optimized to the frequency interference environment.

10 Claims, 16 Drawing Sheets

(51) Int. Cl.
*G01S 13/93* (2006.01)
*H04B 1/713* (2011.01)
*G01S 13/34* (2006.01)
*G01S 13/38* (2006.01)
*H04B 1/00* (2006.01)
*G01S 7/292* (2006.01)
*H04B 15/00* (2006.01)
*H04B 1/715* (2011.01)
*H04L 25/08* (2006.01)

(52) U.S. Cl.
CPC ............ *G01S 13/93* (2013.01); *G01S 13/931* (2013.01); *H04B 1/0032* (2013.01); *H04B 1/713* (2013.01); *H04L 25/08* (2013.01); *G01S 7/292* (2013.01); *G01S 2007/356* (2013.01); *G01S 2007/358* (2013.01); *H04B 15/00* (2013.01); *H04B 2001/7154* (2013.01)

(58) Field of Classification Search
CPC ........ G01S 7/352; G01S 13/88; G01S 15/101; G01S 7/527; G01S 13/56; G01S 7/414; G01S 13/584; G01S 2007/356; H04B 15/00; H04B 1/713; H04B 2001/7154; H04L 25/08
See application file for complete search history.

(56) References Cited

U.S. PATENT DOCUMENTS

| | | | |
|---|---|---|---|
| 2005/0104765 A1* | 5/2005 | Bandhauer | G01S 7/4004 342/82 |
| 2007/0201309 A1* | 8/2007 | Brown | G01F 23/284 367/98 |
| 2009/0121918 A1* | 5/2009 | Shirai | G01S 7/023 342/159 |
| 2012/0169523 A1* | 7/2012 | Lee | G01S 7/023 342/21 |
| 2012/0176266 A1* | 7/2012 | Lee | G01S 7/023 342/27 |
| 2013/0120186 A1* | 5/2013 | Rentala | G01S 13/00 342/194 |

FOREIGN PATENT DOCUMENTS

| | | |
|---|---|---|
| JP | 2008-180703 A | 8/2008 |
| KR | 10-2011-0056747 A | 5/2011 |
| KR | 10-1348548 B1 | 1/2012 |
| KR | 10-1135982 B1 | 4/2012 |
| KR | 10-1184622 B1 | 9/2012 |

* cited by examiner

RADAR DEVICE AND FREQUENCY INTERFERENCE CANCELLATION METHOD THEREOF

TECHNICAL FIELD

The present invention relates to a radar device and a frequency interference cancellation method thereof, and more particularly, to a radar device and a frequency interference cancellation method for cancelling frequency interference between radar devices using the same frequency band.

BACKGROUND ART

A radar sensor is a sensing device for measuring information on a distance, velocity, and an angle by transmitting a radio wave such as a microwave, and receiving a reflection signal reflected from a target.

Such a radar sensor measures the target information by using various radar waveforms of a pulsed Doppler radar, a frequency modulated continuous wave (hereinafter referred to as "FMCW") radar, a stepped-frequency continuous wave (hereinafter referred to as "SFCW") radar, a frequency shift keying (hereinafter referred to as "FSK") radar, and the like.

Generally, the pulse Doppler radar is used as a long-range detection radar, and the FMCW/SFCW/FSK radars are used for short-range detection.

Recently, the radar sensor has been applied to vehicle radar devices to prevent collision during driving and to support safe driving.

For example, FIG. 1 is a block diagram of a radar device using an FMCW radar waveform.

As shown in FIG. 1, a radar device 10 according to the related art includes: an antenna unit 11 for transmitting a radar signal to a periphery of a vehicle and receiving a signal reflected from another vehicle; a radio frequency (RF) unit 12 for generating the transmission signal, converting frequencies of the transmission signal and the reception signal, and amplifying the reception signal; and a digital unit 13 for generating a control signal to generate the transmission signal and determining whether a collision with another vehicle occurs or not based on radar detection information, which is acquired by signal-processing the reception and includes a distance to a target, a velocity of the target, and an angle of the target.

The RF unit 12 includes: a voltage controlled oscillator 21 for outputting the transmission signal, which has a desired oscillation frequency, according to the control signal of the digital unit 13; a low noise amplifier 22 for amplifying the signal received by the antenna unit 11 and attenuating noise; a power divider 23 for distributing the transmission signal generated by the voltage controlled oscillator 21; a pair of mixers 24 for mixing the reception signal outputted from the low noise amplifier 22 with in-phase components and quadrature components of the signal distributed by the power divider 22 to identify the in-phase components and the quadrature components of the reception signal; a pair of gain amplifiers 25 for amplifying gains of the respective components outputted from the pair of mixers 24; and a pair of bandpass filters for filtering the amplified respective components over a predetermined frequency band to remove noise.

The digital unit 13 may include: a signal processing unit 31 for outputting the control signal to generate the transmission signal and signal-processing the reception signal; a DAC 32 for converting the control signal in the form of a digital signal into an analog signal; and an ADC 33 for converting the reception signal in the form of an analog signal into a digital signal.

Since the radar device 10 having the above configuration uses a frequency band which is set to a 77 GHz band or a 24 GHz band, if the radar devices 10 are located in the same area, frequency interference occurs because the same frequency is used.

Accordingly, techniques are developed for avoiding the frequency interference by previously classifying and assigning a pseudo noise code (hereinafter referred to as "PN code"), a Barker code and the like over each user and applying frequency hopping patterns and time hopping patterns to the codes.

In Korean Patent Registration No. 10-1135982 (published on Apr. 17, 2012, hereinafter referred to as "patent document 1"), Korean Patent Registration No. 10-1348548 (published on Jan. 16, 2014, hereinafter referred to as "patent document 2") and the like, there is disclosed a frequency interference cancellation technique of a radar sensor according to the related art.

For example, FIGS. 2 to 4 are views illustrating a method of cancelling frequency interference of a radar according to the related art.

FIG. 2 shows a state in which time synchronization is perfectly matched when the frequency interference is canceled by using a frequency hopping scheme in the FMCW radar according to the related art. In addition, FIG. 3 shows a state in which a noise level is increased, and FIG. 4 shows a state in which a ghost target is generated in the case that the time synchronization is not matched.

The time/frequency transmission signal used by the FMCW radar sensor can be used by previously assigning the transmission signal to each user based on a specific code.

Therefore, as shown in FIG. 2, when different frequency hopping patterns are applied to radars, there is a premise that the time synchronization between radar sensors has to be perfectly matched.

As a result, when the time synchronization is not matched, there is represented an interference characteristic in which the noise level increases as the interference signal appears to flow along the time axis, as shown in FIG. 2.

In addition, even if the radar sensor is separated by using the PN code and the Barker code as the time delay of the interference signal is continuously generated, the frequency interference as shown in FIG. 3 occurs again at a certain time point.

If the time delay becomes longer, as shown in FIG. 4, the frequency interference occurs with an interference characteristic of generating a ghost target appearing as if there is an actual target.

FIGS. 5 and 6 are views for explaining the cases shown in FIGS. 3 and 4 where the noise level is increased and the case where the ghost target is generated, respectively.

As shown in FIGS. 5 and 6, when the interference signal flows along the time axis as the time synchronization is not matched, two types of frequency interference characteristics, in which the noise level is increased or the ghost target is generated, occur repeatedly.

Therefore, depending on the time point at which the radar signal is received, the noise level may be increased, and the ghost target may be generated.

FIGS. 7 and 8 are views illustrating frequency interference characteristics in the case where the continuous wave frequency interference occurs, and in the case where different FMCW waveforms exist, respectively. FIGS. 9 and 10 are views illustrating the case where the noise level is increased, and the case where the ghost target is generated, respectively.

As shown in FIG. 7, when the continuous wave frequency interference occurs, the noise level is increased as the transmission signal and the interference signal are in a cross form.

However, in the case of continuous wave interference, even if the interference signal flows along the time axis as the time synchronization is not matched, the frequency of the interference signal is generated at a fixed position.

As shown in FIG. 8, radar sensors using different FMCW waveforms have an interference characteristic, in which the ghost target is not generated and only the noise level is increased.

Therefore, in frequency interference characteristics of the same type of radar systems, when the time synchronization between the radar sensors is not matched, the two characteristics including an increase in the noise level and generation of the ghost target is repeatedly exhibited as shown in FIGS. 9 and 10.

DISCLOSURE

Technical Problem

As described above, the avoidance method using frequency and time hopping according to the related art can be applied when the time synchronization between the radar sensors is perfectly matched. Otherwise, when a counterpart radar signal is received, the counterpart radar signal appears to continuously flow along the time axis due to the interference.

In addition, due to the asynchronous characteristics between the radar sensors, the frequency interference occurs again at a certain time point even if it is operated with a pre-allocated frequency hopping pattern.

Although there has been proposed a method of matching the time synchronization by using a GPS or a communication modem to solve the time synchronization problem as disclosed in Korean Patent Registration No. 10-1184622 (issued on Sep. 21, 2012, hereinafter referred to as "patent document 3"), the manufacturing cost of the radar sensor is increased due to application of an additional module such as the GPS and the communication modem.

In addition, although there is a method of standardizing a communication/protocol standard to match the time synchronization for each radar sensor manufacturer, this is difficult to be implemented realistically.

Therefore, assuming that the time synchronization between the radar sensors is not matched, it is required to develop a technique capable of cancelling and avoiding the frequency interference even if the above two problems are repeatedly incurred at a certain time point.

To solve the problems described above, one object of the present invention is to provide a radar device and a frequency interference cancellation method thereof, capable of avoiding and cancelling frequency interference of radar sensors that use the same frequency.

Another object of the present invention is to provide a radar device and a frequency interference cancellation method thereof, capable of solving a problem of a noise level increase and ghost target generation caused by the frequency interference, while taking into consideration the time synchronization problem of the radar sensor.

Technical Solution

To achieve the objects described above, according to the present invention, there is provided a radar device including: an antenna unit for transmitting a radar transmission signal to a periphery and receiving a signal reflected from a target; an RF unit for generating the transmission signal, converting frequencies of the transmission signal and the reception signal, and amplifying the reception signal; a signal processing unit for generating a control signal to generate the transmission signal, and cancelling frequency interference from the reception signal of the RF unit; and a control unit for generating radar detection information by using an output signal of the signal processing unit, and generating tracking information by accumulating the radar detection information, wherein the signal processing unit includes a frequency interference cancellation unit for identifying frequency interference characteristics based on an envelope detection result of the reception signal of the RF unit to cancel the ghost target and to cancel the frequency interference that increases a noise level.

In addition, to achieve the objects described above, according to the present invention, there is provided a frequency interference cancellation method of a radar device, the frequency interference cancellation method including: (a) detecting an envelope of a reception signal, which is sampled by an ADC, by using an envelope detector; (b) identifying interference signal characteristics by using a result of the envelope detection; and (c) cancelling a frequency interference signal included in the reception signal based on the interference signal characteristics identified in step (b).

Advantageous Effects

As described above, according to the radar device and the frequency interference cancellation method thereof of the present invention, frequency interference signals generated by other radar devices can be adaptively cancelled according to the frequency interference characteristics identified by using the envelope detection result.

In other words, according to the present invention, if an envelope detection value is equal to or less than a predetermined threshold level, the interference signal is cancelled through cancelling the ghost target by counting a minimum number of targets that commonly exist in a frequency hopping repetition interval as a reference of a number of actual targets and cancelling remaining targets from target counts.

Thus, according to the present invention, a transmission signal processing load for hopping is reduced by changing a hopping pattern only for hopping signals classified as ghost targets as compared with the case where the frequency hopping is performed according to only a predetermined hopping pattern.

In addition, according to the present invention, if the envelope detection value exceeds the threshold level, the interference signal is cancelled through zero padding during a frequency interference signal time interval, and the signal is recovered into a continuous signal by using an extrapolation scheme.

Accordingly, according to the present invention, the noise level increased due to the frequency interference can be reduced, and the probability of detecting an actual target signal can be increased.

As a result, according to the present invention, the hopping pattern is changed in real time according to a radar frequency interference environment, thereby operating the hopping pattern adaptively optimized to the frequency interference environment.

BEST MODE

Mode for Invention

Hereinafter, a radar device and a frequency interference cancellation method thereof according to a preferred embodiment of the present invention will be described in detail with reference to the accompanying drawings.

Figure 1:
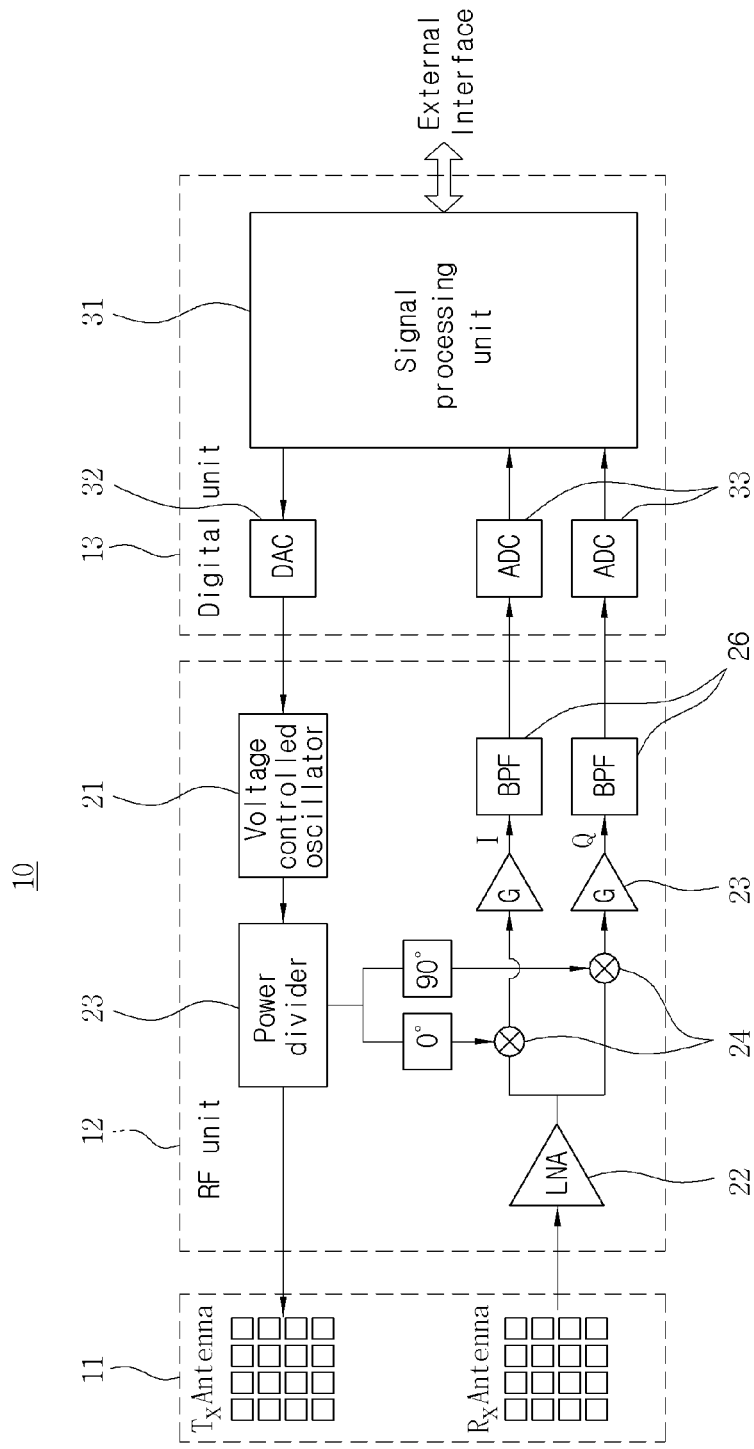
FIG. 1 is a block diagram of a radar device using an FMCW radar waveform.
Figure 2:
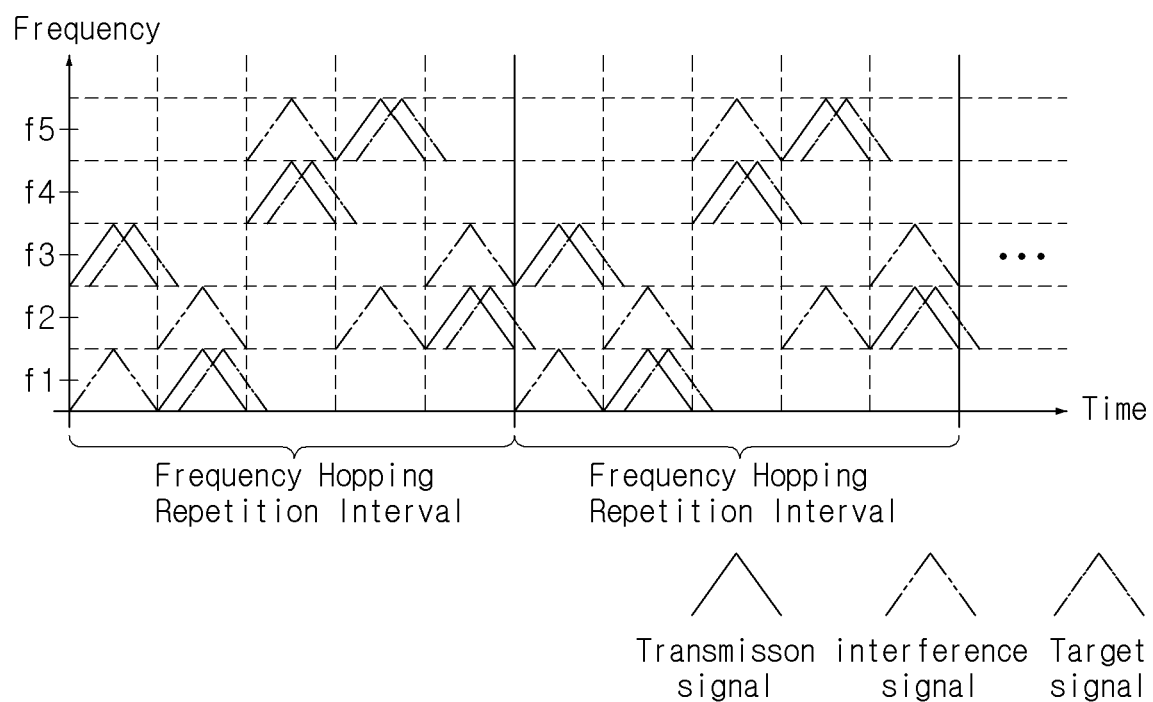
FIGS. 2 to 4 are views illustrating a method of cancelling a frequency interference of a radar according to the related art.
Figure 3:
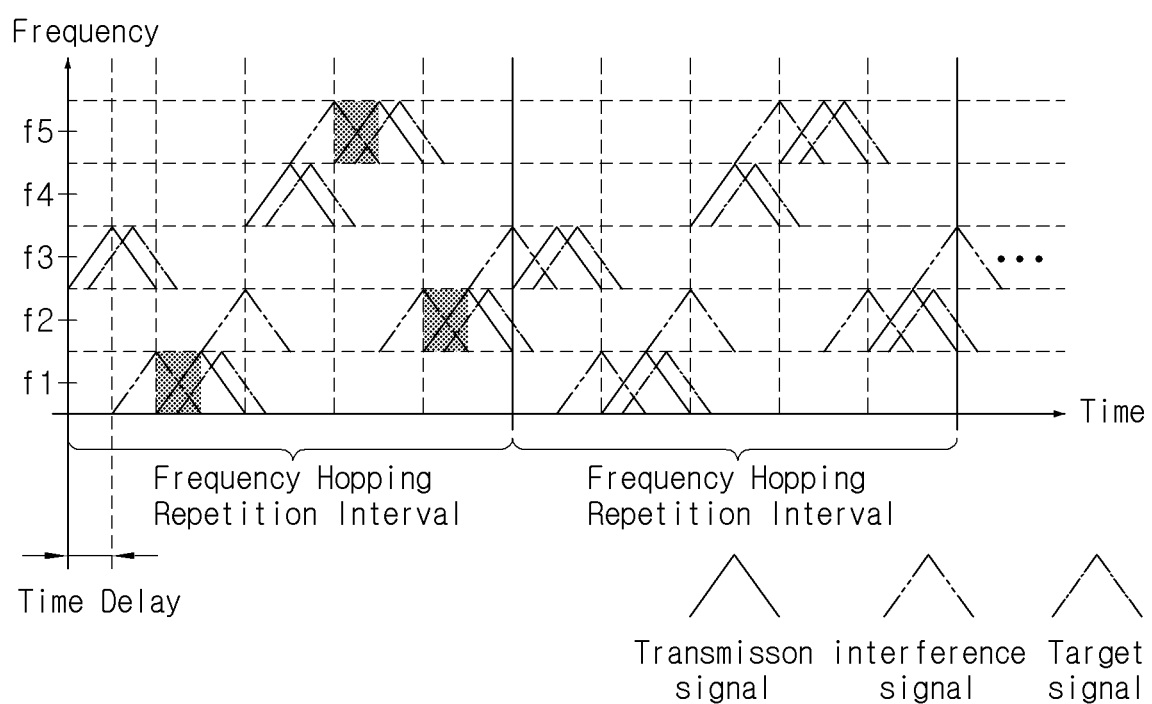
Figure 4:
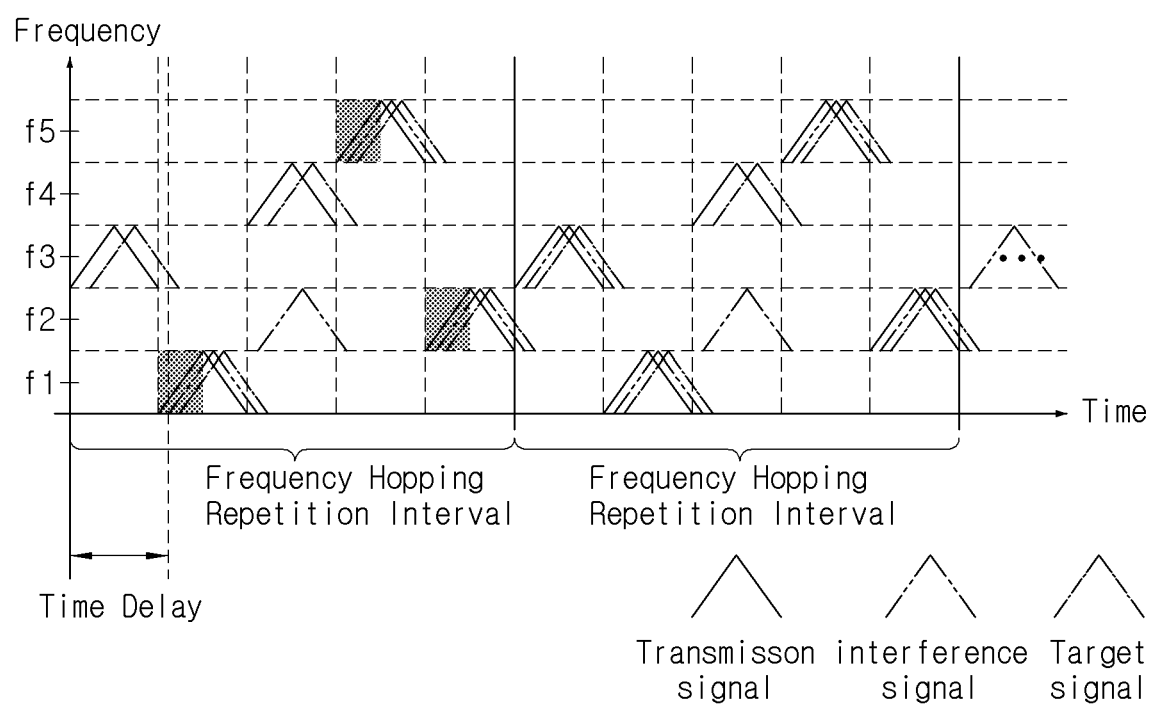
Figure 5:
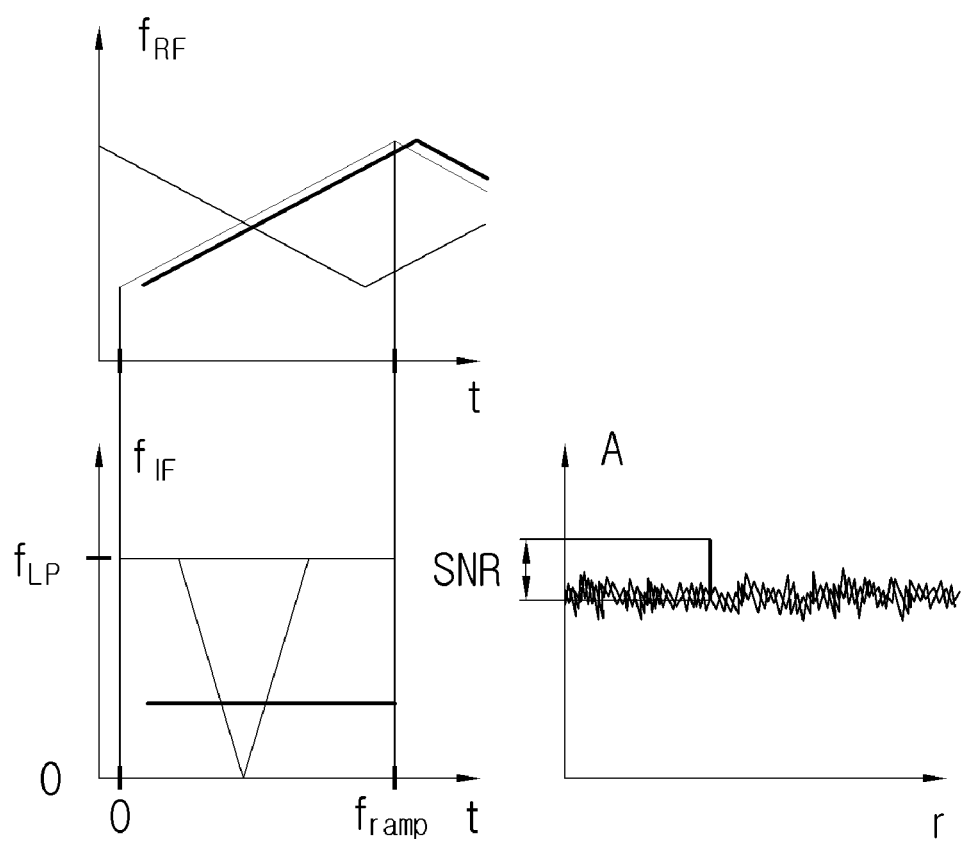
FIGS. 5 and 6 are views for explaining the cases shown in FIGS. 3 and 4 where the noise level is increased and the case where the ghost target is generated, respectively.
Figure 6:
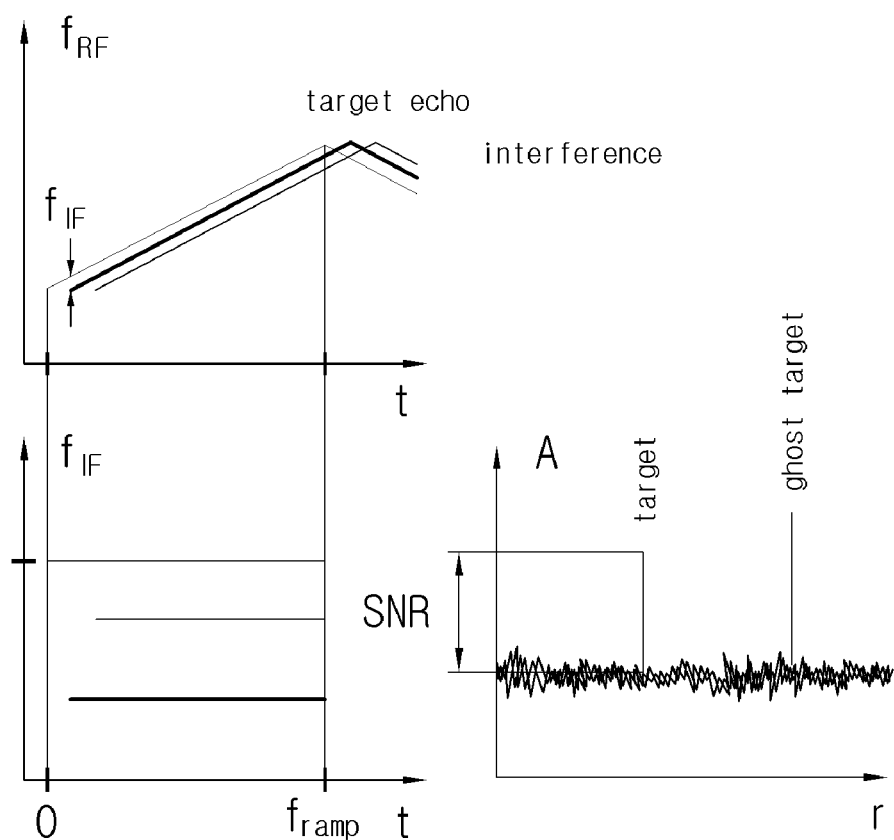
Figure 7:
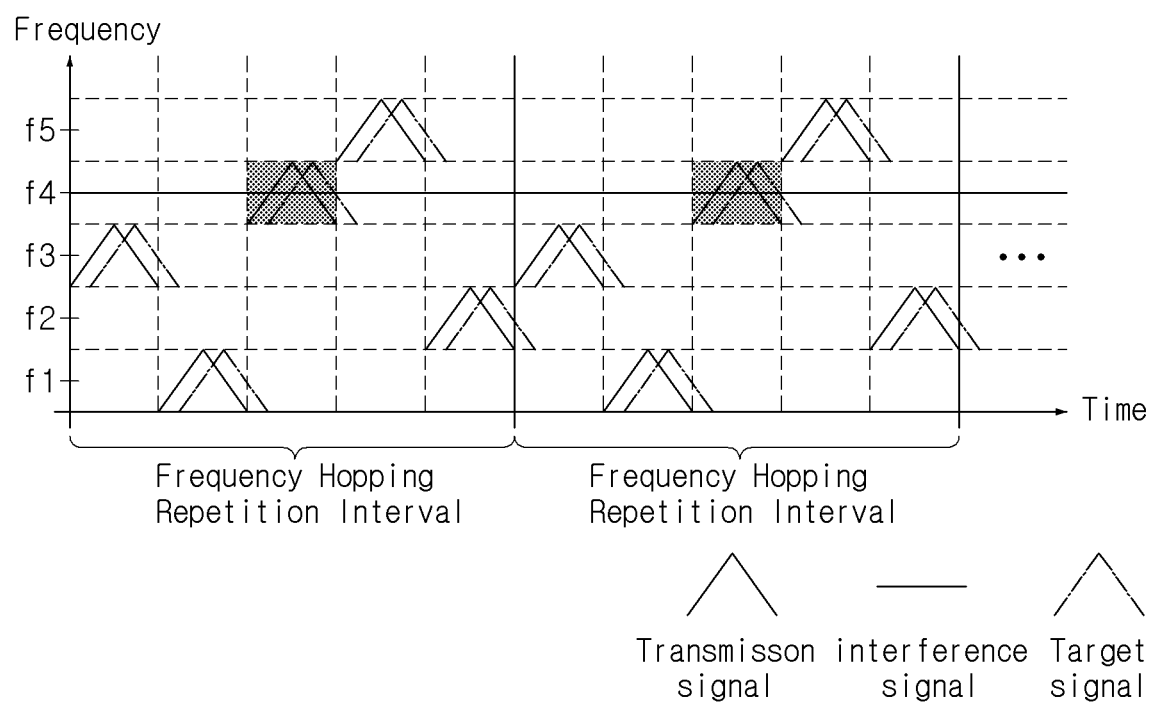
FIGS. 7 and 8 are views illustrating frequency interference characteristics in the case where the continuous wave frequency interference occurs, and in the case where different FMCW waveforms exist, respectively.
Figure 8:
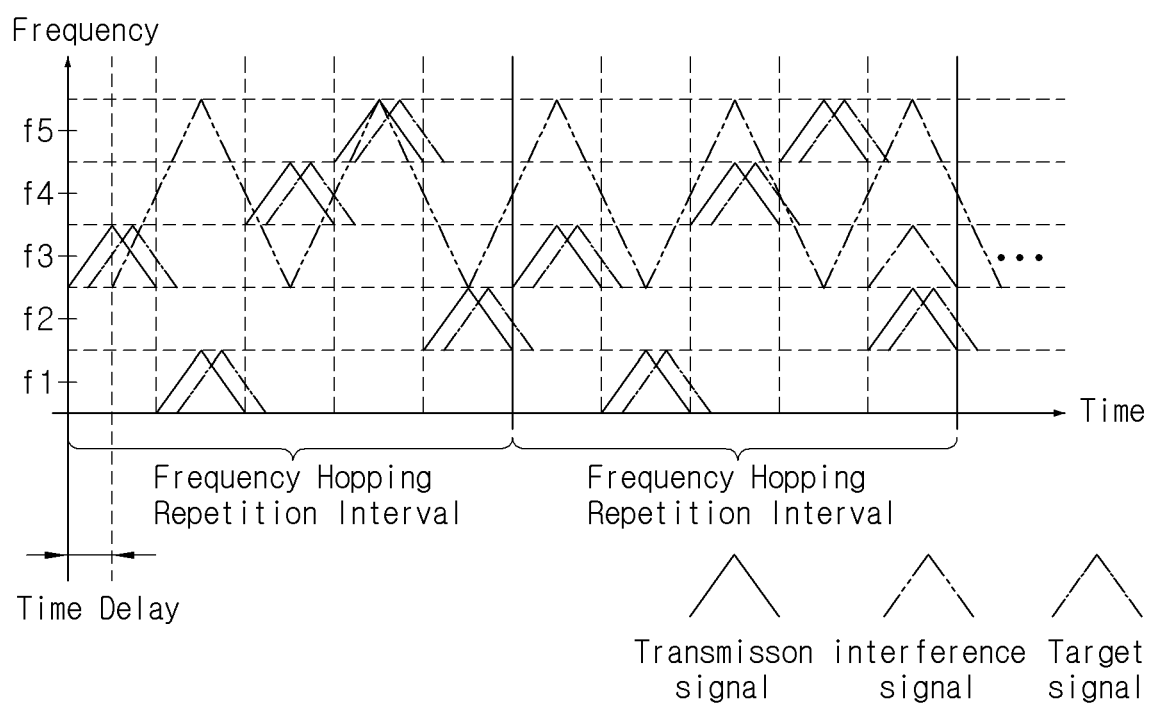
Figure 9:
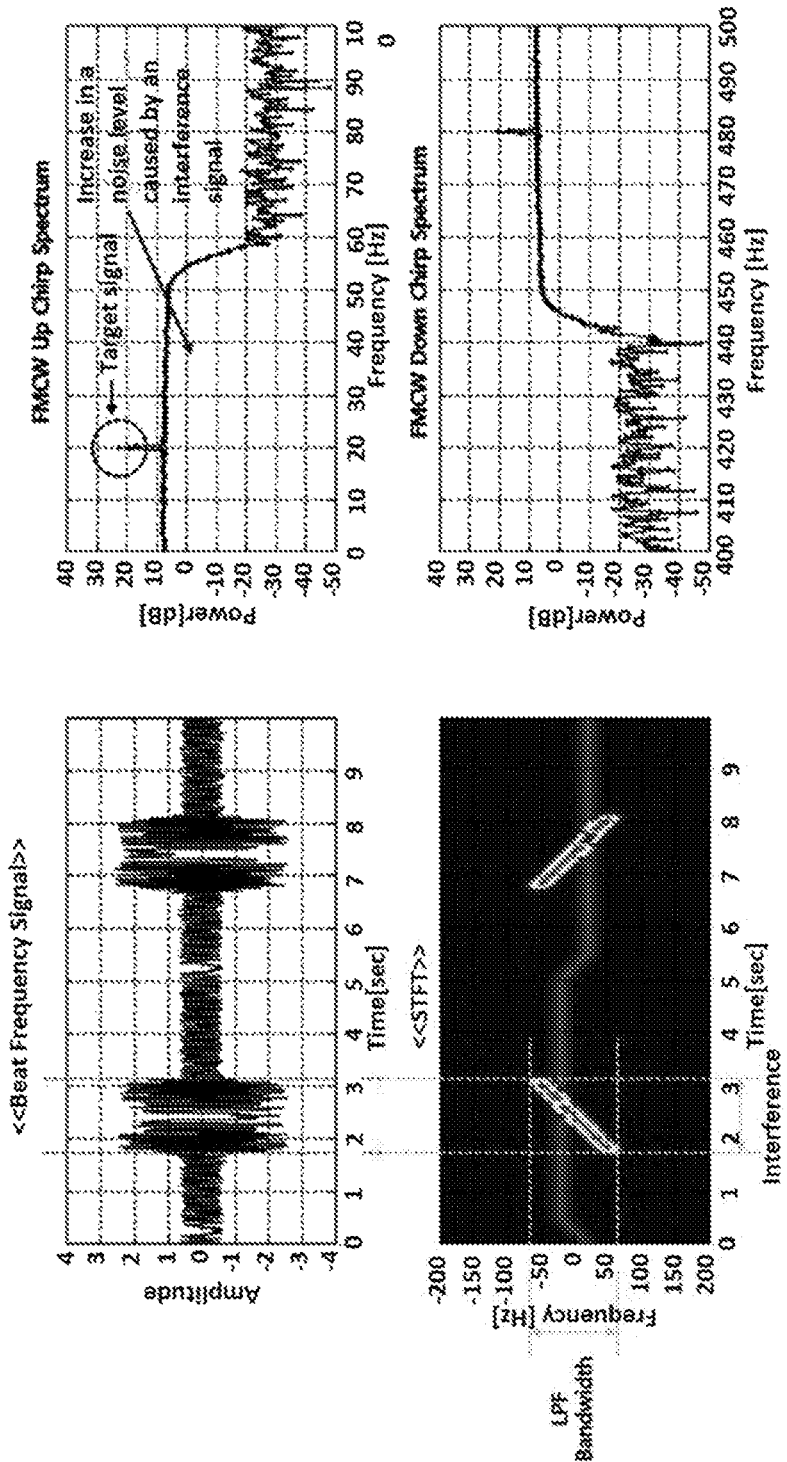
FIGS. 9 and 10 are views illustrating the case where the noise level is increased, and the case where the ghost target is generated, respectively.
Figure 10:
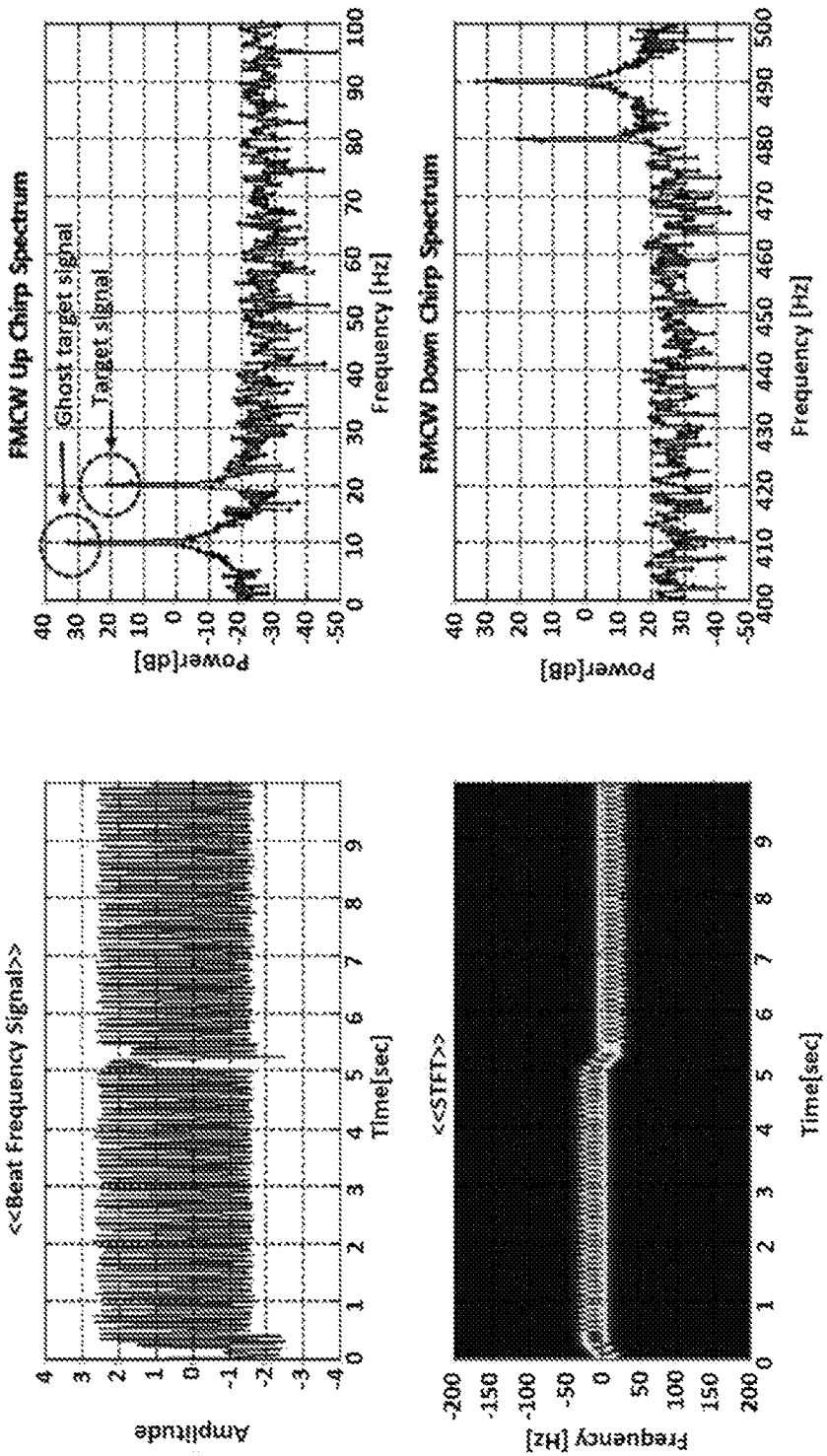

In the present embodiment, the configuration of the FMCW radar device having a single-antenna structure shown in FIG. 1 to provide vehicle collision prevention and accident recording functions will be cited for the convenience of explanation.

However, the present invention is not limited thereto, and it should be noted that the present invention can be applied to a short-range search and detection radar device used for various purposes, such as an intelligent transportation system (ITS) radar for measuring traffic volume, a radar level meter, a short-range displacement measurement radar, and a short-range actuated control radar.

Further, the present invention is applicable not only to the FMCW radar device having the single-antenna structure, but also to an FMCW radar device having a multiple-antenna structure or a plurality of antenna arrays, and various types of radar devices including an SFCW radar and an FSK radar.

Figure 11:
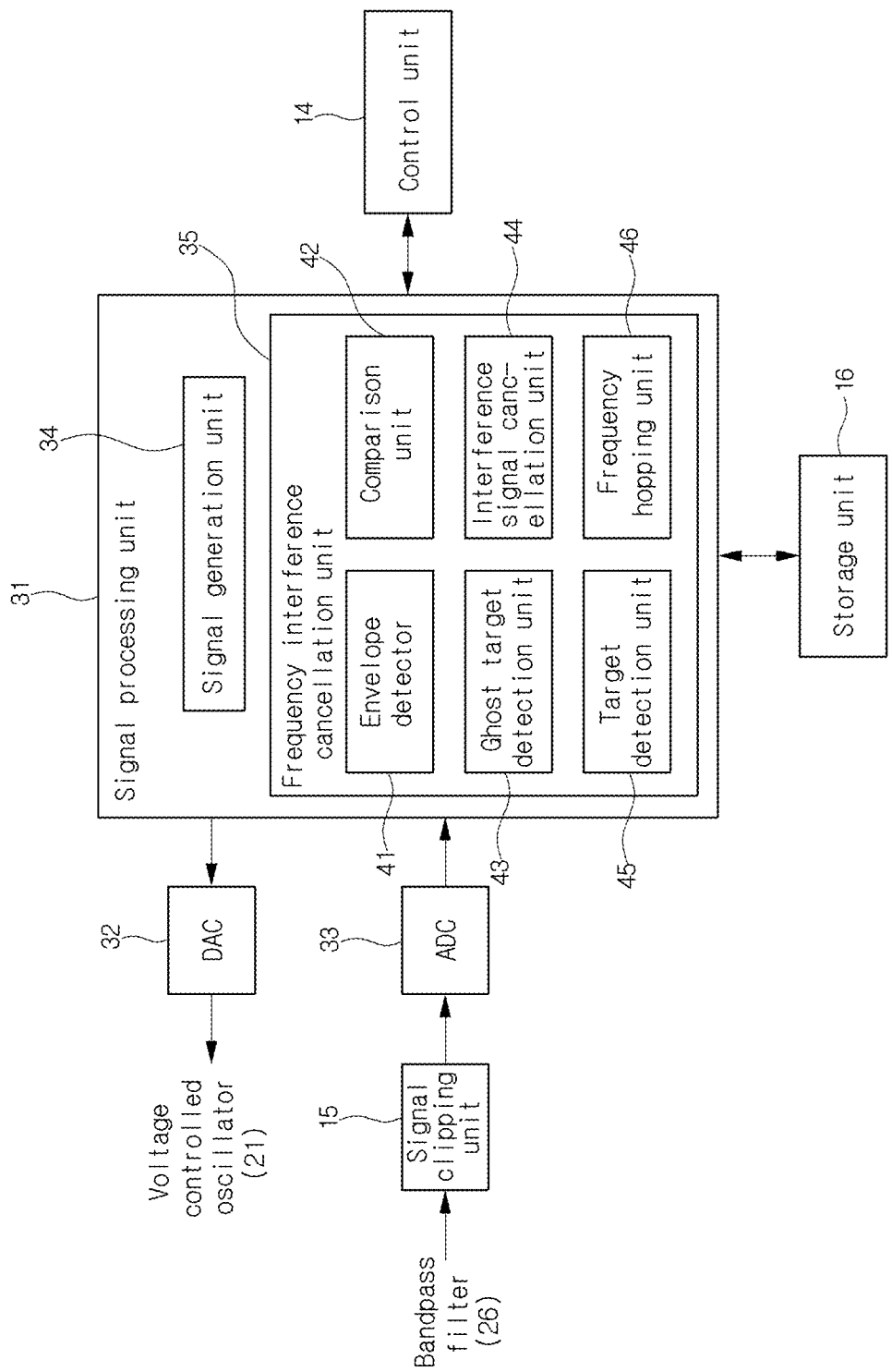
FIG. 11 is a block diagram showing a digital unit applied to a radar device according to a preferred embodiment of the present invention.

FIG. 11 is a block diagram showing a digital unit applied to a radar device according to a preferred embodiment of the present invention.

As shown in FIGS. 1 and 11, the radar device 10 according to the preferred embodiment of the present invention includes: an antenna unit 11; an RF unit 12; a signal processing unit 31 for generating a control signal to generate a transmission signal, and cancelling frequency interference from a reception signal of the RF unit; and a control unit 14 for generating radar detection information by using an output signal of the signal processing unit 31, and generating tracking information by accumulating the radar detection information.

The signal processing unit 31 may include: a signal generation unit 34 for generating the control signal; and a frequency interference cancellation unit 35 for cancelling a frequency interference signal from the reception signal of the RF unit 12 by using a digital signal processing scheme.

In addition, the radar device 10 according to the preferred embodiment of the present invention may further include: a DAC 32; an ADC 33; a signal clipping unit 15 for clipping a target signal inputted from the RF unit 12 to the ADC 33 so as to protect the ADC 33; and a storage unit 16 for storing a signal sampled by the ADC 33.

Since the target signal is a return signal which is reflected from a target after transmitted to the target, the reception power of the target signal is inversely proportional to the fourth power of the distance between the target and the radar device 10.

Meanwhile, since the interference signal radiated unidirectionally from a counterpart radar device (not shown) is received, the interference signal is inversely proportional to the square of the distance between the radar device 10 and a counterpart radar device.

Therefore, the interference signal is generally received with a stronger reception power than the signal power of the received target signal.

As the interference signal is received through the antenna unit 11 and inputted to the low noise amplifier 22 of the RF unit 12 and the ADC 33, the low noise amplifier 22 or the ADC 33 may be damaged due to the large signal power level of the interference signal.

In order to solve this problem, the signal clipping unit 15 can prevent and protect the ADC 33 from being damaged, by clipping the interference signal having a signal power level larger than the signal power level of a general target signal before the signal is inputted to the ADC 33.

The storage unit 16 stores a signal sampled by the ADC 33.

The storage unit 33 may be provided as a main memory that stores a driving program for driving the vehicular radar device 10, and the radar detection information and the accumulated information generated by the control unit 14, or may be provided separately from the main memory.

The frequency interference cancellation unit may include: an envelope detector 41 for detecting an envelope of a reception signal outputted from an ADC; a comparison unit 42 for comparing a detected value with a predetermined threshold level; a ghost target cancellation unit 43 for cancelling a ghost target from a signal, when the signal has a level equal to or less than the threshold level; an interference signal cancellation unit 44 for cancelling an interference signal included in a signal which has a level exceeding the threshold level; a target detection unit 45 for detecting a final target from which the ghost target and the interference signal are canceled; and a frequency hopping unit 46 for hopping a frequency of a transmission signal to another frequency band with respect to only a signal in which the interference has occurred among detected final targets.

Next, the frequency interference cancellation method of the radar device according to the preferred embodiment of the present invention will be described in detail with reference to FIG. 12.

Figure 12:
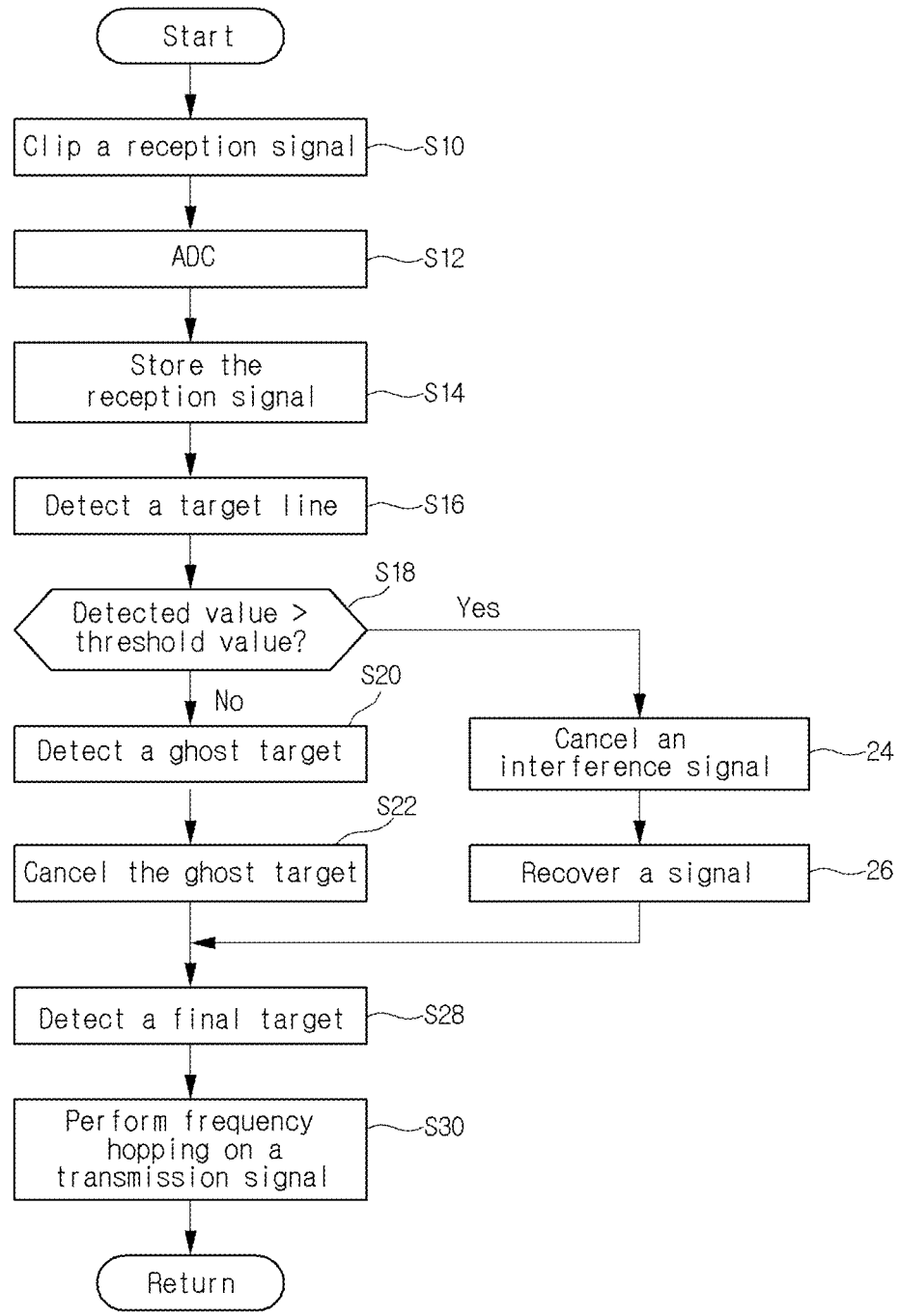
FIG. 12 is a flowchart for explaining a frequency interference cancellation method of the radar device according to the preferred embodiment of the present invention.

FIG. 12 is a flowchart for explaining a frequency interference cancellation method of the radar device according to the preferred embodiment of the present invention.

In step S10 shown in FIG. 12, the signal clipping unit 15 clips the reception signal outputted from the RF unit 12 to prevent damage of the ADC 33 caused by the interference signal having a signal power level larger than the signal power level of a general target signal before the signal is inputted to the ADC 33, thereby safely protecting the ADC 33.

Then, the ADC 33 receives and samples the reception signal from the signal clipping unit 15 in step S12, and the sampled reception signal is stored in the storage unit 16 in step S14.

The envelope detector 41 detects an envelope of the reception signal in step S16, and the comparing unit 42 compares a value k detected by the envelope detector 41 with the threshold level in step S18.

Figure 13:
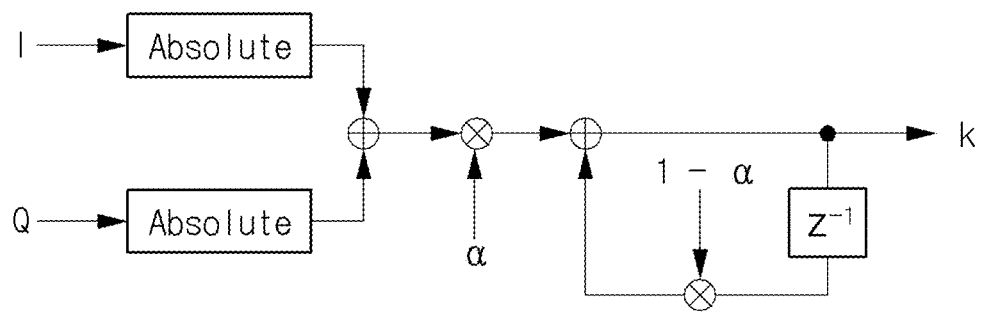
FIG. 13 is a view illustrating a digital envelope detection process using an envelope detector.

FIG. 13 is a view illustrating a digital envelope detection process using an envelope detector.

As shown in FIG. 13, the envelope detector 41 includes a digital integrator having a smoothing factor α, and minimizes the influence of noise in the envelope detection process through the smoothing factor α, thereby attenuating sensitive to the noise.

Figure 14:
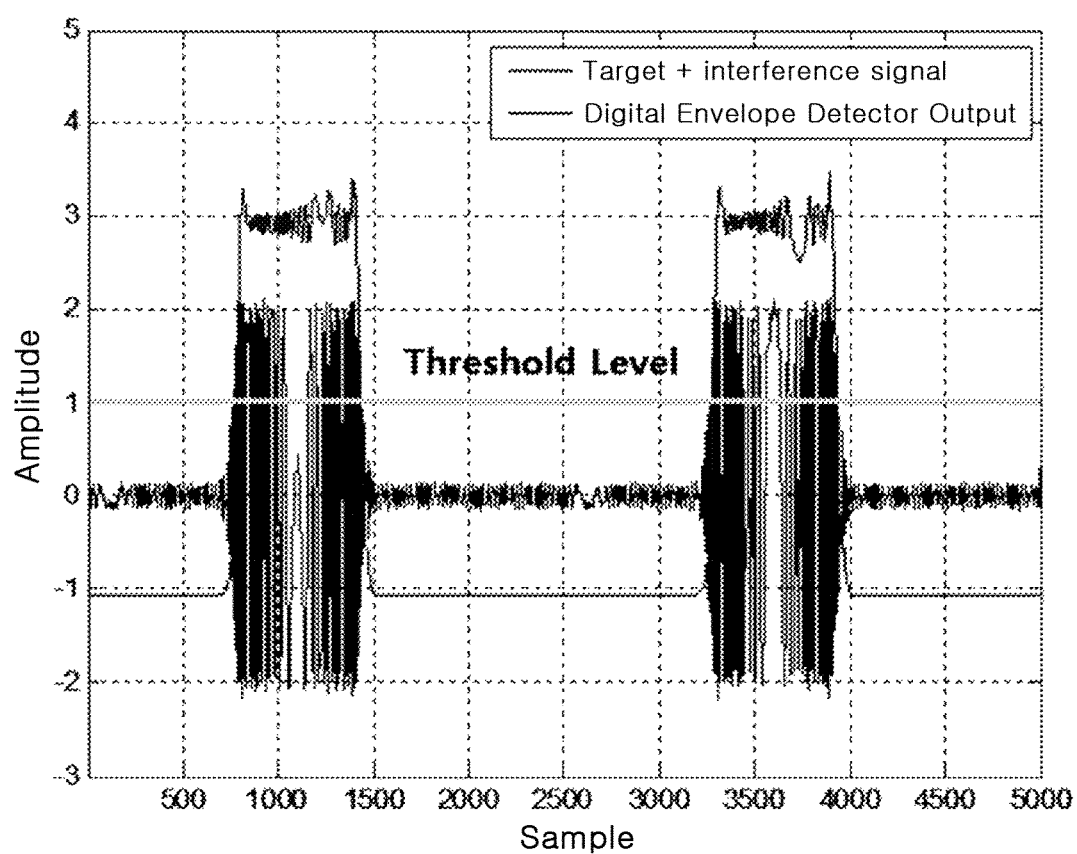
FIGS. 14 and 15 are graphs of reception signals of an FMCW radar device.
Figure 15:
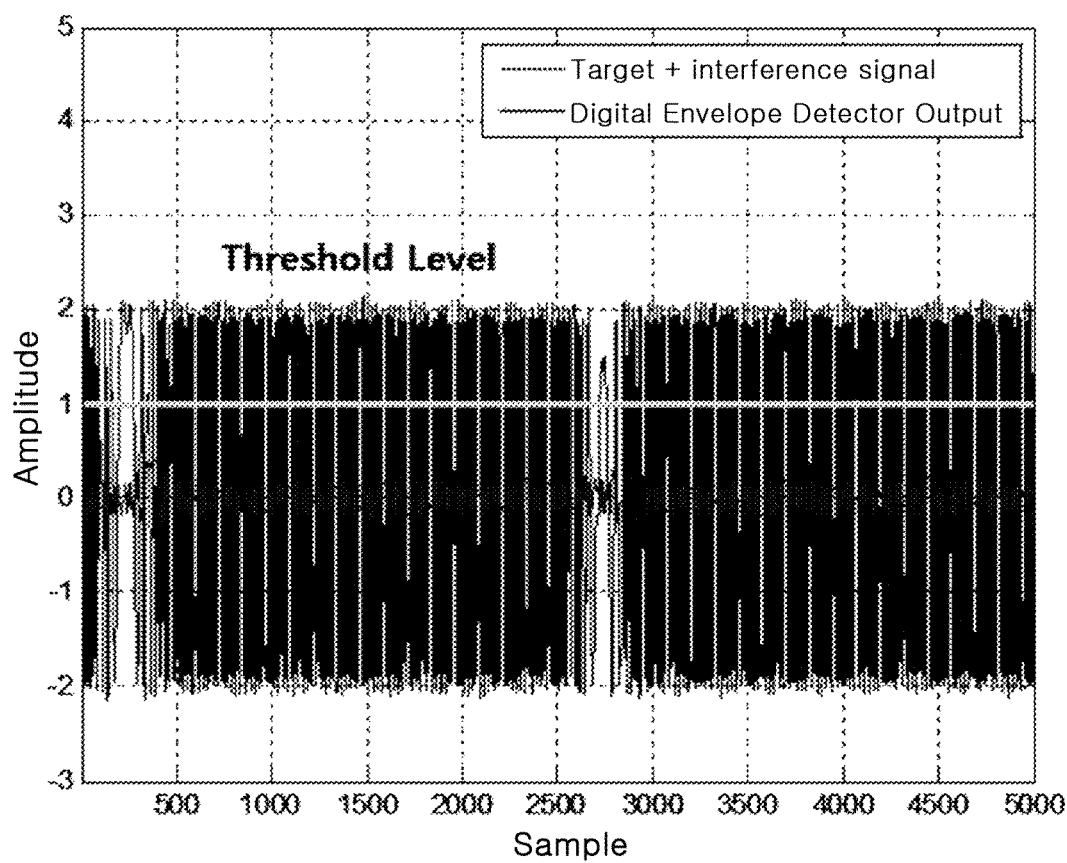

FIGS. 14 and 15 are graphs of reception signals of an FMCW radar device.

FIGS. 14 and 15 illustrate a case where data stored in the storage unit 16, that is, an up/down beat frequency of the reception signal has a level larger than the threshold level, and a case where the up/down beat frequency has a level equal to or less than the threshold level, respectively.

As shown in FIG. 14, cross-form frequency interference occurs in a signal having a signal level larger than the threshold level.

Therefore, the frequency interference cancellation unit 35 determines that there is frequency interference that increases the noise level when the value k detected through the envelope detector 41 is larger than a certain threshold level.

Meanwhile, as shown in FIG. 15, when the detected value k is equal to or less than the threshold level, the frequency interference cancellation unit 35 may determine that a normal target signal is received without the ghost target or the frequency interference.

Therefore, the frequency interference cancellation unit 35 may distinguish whether the frequency interference characteristic that currently exerts an influence is related to the increase in the noise level or the generation of the ghost target even if the time synchronization is not matched, by applying a frequency hopping technique to the radar transmission signal and using the envelope detector 41.

As described above, if there is a ghost target in a state where the frequency hopping pattern is applied, the ghost target may be generated only in a specific hopping pattern, and may not be generated in the remaining hopping patterns.

Figure 16:
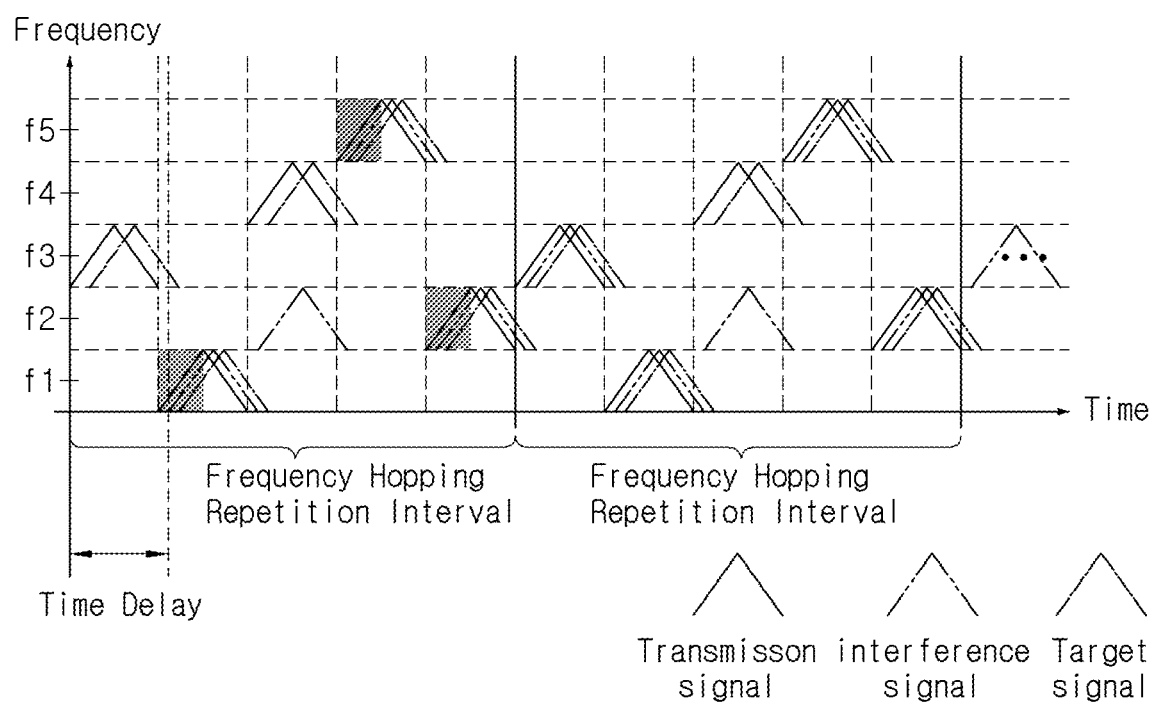
FIG. 16 is a view illustrating frequency interference where a ghost target is generated with respect to a specific frequency hopping signal.

FIG. 16 is a view illustrating frequency interference where a ghost target is generated with respect to a specific frequency hopping signal.

If the comparison result of step S18 indicates that the detected value is equal to or less than the threshold level, the frequency interference cancellation unit 35 distinguishes ghost targets from actual targets by using characteristics that a ghost target A is generated for a specific frequency hopping signal and ghost targets are not generated in some hopping patterns as shown in FIG. 16.

Thus, the ghost target cancellation unit 43 performs the target detection processing for all the reception signals during the frequency hopping repetition interval in FIG. 16.

The frequency hopping repetition interval is set as one interval for analyzing the frequency interference, and the frequency interference cancellation unit 35 can determine the type of frequency interference based on the reception signal in the set frequency hopping repetition interval.

Meanwhile, when the signals present in the frequency hopping repetition interval are subjected to the target detection processing through fast Fourier transform (FFT) and radar detection (constant false alarm, CFAR), the number of signals with ghost targets is larger than the number of signals with no ghost target.

Accordingly, in step S20, the ghost target cancellation unit 43 detects the ghost target by counting the minimum number of common targets as a reference of the number of actual targets when the target signal of the frequency hopping repetition interval is detected.

In addition, in step S22, the ghost target cancellation unit 43 cancels the ghost target by determining all targets, which has no common target information set as the reference, as the ghost target, excluding the targets from the target counts, and determining the targets as a hopping signal where the frequency interference occurs.

*Accordingly, the frequency hopping unit 46 can then hop only the hopping pattern determined as the ghost target to another frequency band at the subsequent frequency hopping repetition interval.

As described above, according to the present invention, the hopping pattern is changed only for the hopping signal classified as the ghost target, thereby reducing the transmission signal processing load for hopping as compared with the case where the frequency hopping is performed according to only a predetermined hopping pattern.

In addition, according to the present invention, the hopping pattern is changed in real time according to a radar frequency interference environment, thereby operating the hopping pattern adaptively optimized to the frequency interference environment.

Meanwhile, the frequency interference cancellation unit 35 may determine that the frequency interference which increases the noise level has occurred in the hopping signal where there is an interval in which an output value k of the envelope detector 41 is higher than the threshold level.

In other words, when the detected value k exceeds the threshold level as a result of the comparison in step S18, resulting in occurrence of the frequency interference that increases the noise level, the interference signal cancellation unit 44 may acquire information on a time position and a time length at which the frequency interference occurs by using the output value k of the envelope detector 41.

Figure 17:
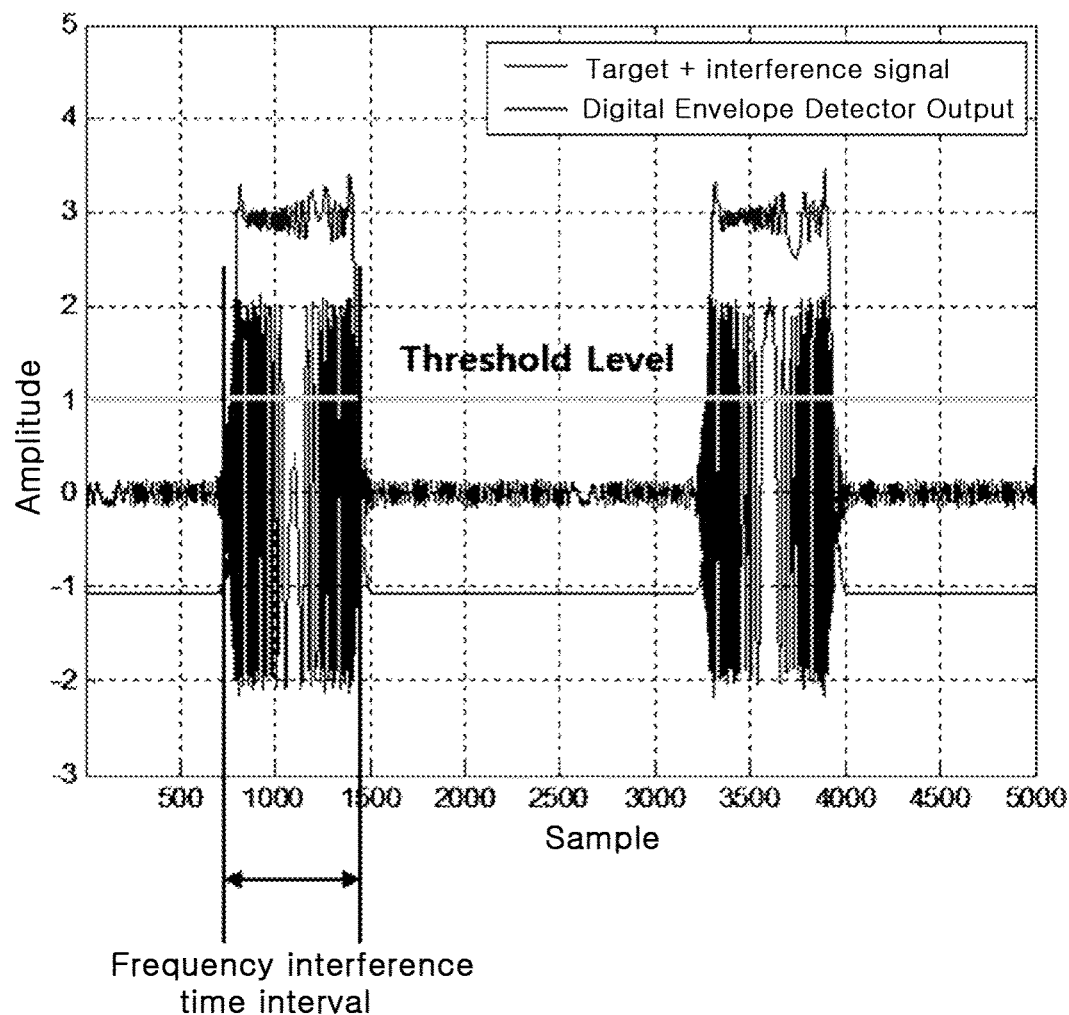
FIG. 17 is a view illustrating frequency interference that increases a noise level.

FIG. 17 is a view illustrating frequency interference that increases a noise level.

In step S24, when a frequency interference time interval is detected as shown in FIG. 17, the interference signal cancellation unit 44 cancels the interference signal through zero padding in which '0' is inserted as the signal level during the frequency interference time interval.

In addition, in step S26, the interference signal cancellation unit 44 recovers a signal by applying an extrapolation scheme to maintain the signal in an unbroken continuous signal form, in order to maintain continuity with the remaining peripheral signals in the cancelled frequency interference signal time interval.

As described above, according to the present invention, when the frequency interference time interval is detected, the zero padding is performed during the corresponding frequency interference time interval, thereby reducing the noise level increased due to the frequency interference.

In addition, according to the present invention, the signal is recovered by applying the extrapolation scheme to the frequency interference time interval, so that the noise level that is increased due to the frequency interference is further reduced as compared with the case where only the zero padding is performed, thereby increasing the probability of detecting the actual target signal.

At this time, it is possible to avoid in real time the frequency interference that currently occurs by hopping only the frequency hopping pattern that increases the noise level to another frequency band at the subsequent frequency hopping repetition interval using the frequency hopping unit 46.

In other words, in step S28, the target detection unit 45 finally detects the target in the target signal from which the ghost target has been removed in step S22 and the target signal on which the frequency interference which raises the noise level in steps S24 and S26 is removed.

Then, in step S30, the frequency hopping unit 46 hops the frequency of the transmission signal to another frequency band with respect to only a signal in which the interference has occurred among detected final targets.

Thereafter, the control unit 14 generates a radar detection signal including velocity, distance, and direction information of the target by using the target signal from which the frequency interference signal has been cancelled, and generates a tracking signal including information on a distance to the target, and velocity information and direction information of the target by accumulating the radar detection signal, so as to determine whether the vehicle collision has occurred to give a warning.

Through the above process, according to the present invention, the frequency interference signals generated by other radar devices can be adaptively cancelled according to the frequency interference characteristics identified by using the envelope detection result.

Although the present invention invented by the present inventor has been described in detail with reference to the embodiments, the present invention is not limited to the above embodiments, and various modifications are possible without departing from the scope and spirit of the present invention.

In other words, although the vehicular radar device having the vehicle collision prevention and accident recording functions has been described in the above embodiments, the present invention is not limited thereto, and the present invention can be modified so as to be applied to the short-range search and detection radar device used for various purposes, such as the ITS radar for measuring traffic volume, the radar level meter, the short-range displacement measurement radar, and the short-range actuated control radar.

In addition, although an FMCW radar sensor having a single antenna-structure has been described in the above embodiments, the present invention is not limited thereto, and the present invention can be modified so as to be applicable not only to the FMCW radar device having the single-antenna structure, but also to the FMCW radar device having a multiple-antenna structure, and various types of radar devices including the SFCW radar and the FSK radar.

INDUSTRIAL APPLICABILITY

The present invention may be applied to a radar device and a frequency interference cancellation method thereof, in which the hopping pattern is changed in real time according to a radar frequency interference environment, thereby operating the hopping pattern adaptively optimized to the frequency interference environment.

The invention claimed is:
1. A radar device comprising:
an antenna unit for transmitting a radar transmission signal to a periphery and receiving a reception signal reflected from a target;
an RF unit for generating the radar transmission signal, converting frequencies of the radar transmission signal and the reception signal, and amplifying the reception signal;
a signal processing unit for generating a control signal to generate the radar transmission signal, and cancelling a frequency interference from the reception signal of the RF unit; and
a control unit for generating radar detection information by using an output signal of the signal processing unit, and generating tracking information by accumulating the radar detection information,
wherein the signal processing unit includes a frequency interference cancellation unit for identifying frequency interference characteristics by comparing an envelope detection value of the reception signal of the RF unit with a predetermined threshold level to cancel a ghost target and the frequency interference that increases a noise level according to the identified frequency interference characteristics,
the frequency interference cancellation unit cancels the ghost target by counting a minimum number of targets that commonly exist in a frequency hopping repetition interval as a reference of a number of actual targets and cancelling remaining target counts, if a value detected due to generation of the ghost target is equal to or less than the threshold level, and
the frequency interference cancellation unit reduces the noise level, which is increased due to the frequency interference, by cancelling an interference signal through zero padding during a frequency interference signal time interval and recovering the reception signal into a continuous signal by using an extrapolation scheme, if the detected value exceeds the threshold level due to an increase in the noise level caused by the frequency interference.

2. The radar device of claim 1, wherein the frequency interference cancellation unit comprises:
an envelope detector for detecting an envelope of the reception signal;
a comparison unit for comparing a value detected by the envelope detector with a predetermined threshold level;
a ghost target cancellation unit for cancelling the ghost target from the reception signal, when the reception signal has a level equal to or less than the threshold level as a result of comparison performed by the comparison unit;
an interference signal cancellation unit for cancelling the interference signal that increases the level of noise included in the reception signal which has a level exceeding the threshold level;
a target detection unit for detecting a final target from which the ghost target and the interference signal are canceled; and
a frequency hopping unit for hopping a frequency of the reception signal to another frequency band with respect to only the reception signal in which the interference has occurred among detected final targets.

3. The radar device of claim 2, further comprising:
an ADC for sampling the reception signal and transmitting the sampled reception signal to the envelope detector; and a signal clipping unit for clipping the interference signal, which has a larger signal power than a target signal, to prevent the ADC from being damaged.

4. A frequency interference cancellation method of a radar device for cancelling a frequency interference signal included in a reception signal, the frequency interference cancellation method comprising:
(a) detecting an envelope of the reception signal, which is sampled by an ADC, by using an envelope detector;
(b) comparing a value detected by the envelope detector with a predetermined threshold level to identify interference signal characteristics;
(c) cancelling a ghost target by counting a minimum number of targets that commonly exist in a frequency hopping repetition interval as a reference of a number of actual targets and cancelling remaining target counts, if a value detected due to generation of the ghost target is equal to or less than the threshold level as a result of identifying the interference signal characteristics in step (b); and
(d) reducing a noise level, which is increased due to frequency interference, by cancelling the interference signal through zero padding during a frequency interference signal time interval and recovering the reception signal into a continuous signal by using an extrapolation scheme, if the detected value exceeds the threshold level due to an increase in the noise level caused by the frequency interference as a result of identifying the interference signal characteristics.

5. The frequency interference cancellation method of claim 4, wherein step (c) comprises:
(c1) detecting the ghost target from the reception signal which has a level equal to or less than the threshold level; and
(c2) cancelling the detected ghost target,
wherein, in step (c1), the ghost target is detected by performing target detection processing through fast Fourier transform and radar detection on signals existing in a predetermined frequency hopping repetition interval to count a minimum number of common targets as a reference of the number of actual targets, and
in step (c2), the ghost target is canceled, which has no common target information set as the reference in step (c1), by excluding the actual targets from the target counts, and determining the ghost targets as a hopping signal where the frequency interference occurs.

6. The frequency interference cancellation method of claim 5, wherein step (d) comprises:
(d1) acquiring information on a time position and a time length at which the frequency interference occurs from the reception signal which has a level exceeding the threshold level;
(d2) cancelling the interference signal through the zero padding during an acquired frequency interference time interval; and
(d3) recovering the reception signal by applying the extrapolation scheme to the frequency interference signal time interval to maintain a continuous signal form.

7. The frequency interference cancellation method of claim 4, further comprising (e) avoiding the frequency interference in real time by finally detecting the ghost target from a target signal from which the frequency interference signal is canceled and hopping only a frequency hopping pattern where the interference signal is generated to another frequency band at a subsequent frequency hopping repetition interval.

8. The frequency interference cancellation method of claim 7, further comprising (f) clipping, before step (a), the reception signal inputted to the ADC to prevent and protect the ADC from being damaged caused by the interference signal which has a larger signal power level than the target signal.

9. The frequency interference cancellation method of claim 5, further comprising (e) avoiding the frequency interference in real time by finally detecting the actual target from the reception signal from which the frequency interference signal is canceled and hopping only a frequency hopping pattern where the interference signal is generated to another frequency band at a subsequent frequency hopping repetition interval.

10. The frequency interference cancellation method of claim 6, further comprising (e) avoiding the frequency interference in real time by finally detecting the actual target from the reception signal from which the frequency interference signal is canceled and hopping only a frequency hopping pattern where the interference signal is generated to another frequency band at a subsequent frequency hopping repetition interval.

* * * * *